INVENTOR
A. ASHKIN
BY David P. Kelley
ATTORNEY

CYCLOTRON WAVE QUADRUPOLE TYPE STRUCTURE USING ONLY TWO POLES

Filed April 20, 1960 3 Sheets-Sheet 2

INVENTOR
A. ASHKIN
BY David P. Kelley
ATTORNEY

INVENTOR
A. ASHKIN
BY David P. Kelley
ATTORNEY

United States Patent Office 3,178,646
Patented Apr. 13, 1965

3,178,646

CYCLOTRON WAVE QUADRUPOLE TYPE STRUCTURE USING ONLY TWO POLES

Arthur Ashkin, Bernardsville, N.J., assignor to Bell Telephone Laboratories, Incorporated, New York, N.Y., a corporation of New York Filed Apr. 20, 1960, Ser. No. 23,526
9 Claims. (Cl. 330—4.7)

This invention relates to electron beam devices which utilize the interaction between an electric field and the cyclotron wave on the beam, and, more particularly, to interaction circuits for such devices.

In general, electron beam devices which utilize the interaction between the beam and an electromagnetic wave to produce amplification make use of either cyclotron wave or space-charge wave modulations on the beam. Devices of this type are inherently noisy. That is to say, there exist on the electron beam random modulations and velocity variations which give rise to spurious signal variations at the output of the device, thereby degrading the quality of the output signal. When such devices are operated in the so-called slow mode, there is a theoretical minimum noise level that, to date, has resisted efforts of workers in the art to improve upon it. As a consequence, recent efforts have been directed to the utilization of the fast mode of the electron beam since, in this mode, there is no theoretical minimum noise figure.

In order to produce amplification in the so-called fast mode, it is necessary that an external source of radio frequency power, commonly called pumping power, be used to modulate or act upon the beam in addition to the signal modulation of the beam. In this case the signal does not extract its energy for amplification from the beam but from the pumping power. It has been found that when operation is in the fast space-charge wave mode the higher harmonics produced by the mixing of the pump and signal waves on the beam couple to the signal wave and, if these harmonics contain noise, this noise is introduced into the signal. On the other hand, it has been found that if operation is in the fast cyclotron wave mode of the beam the dispersive characteristics of the beam are such that there is no coupling between the signal and the higher harmonics and, hence, the introduction of additional noise into the signal is avoided.

In an article entitled "The Quadrupole Amplifier, a Low-Noise Parametric Device," by Adler, Hrbek and Wade, proceedings of the IRE, October 1959, pages 1713 to 1723, there is disclosed an amplifier device which utilizes the fast cyclotron wave of the beam to produce low noise amplification. Basically, the amplifier disclosed in the article comprises a first circuit for modulating the beam in the fast cyclotron mode with a signal to be amplified and for simultaneously stripping noise from the beam, a second circuit comprising a group of four plates in a quadrupolar arrangement for applying pump wave energy to the signal modulations on the beam, and an output circuit for abstracting the amplified signal from the beam. Such an arrangement has successfully produced low noise amplification.

Detracting from the obvious advantages of such a device, however, are certain problems which arise when it is desired to operate at microwave frequencies. At these higher frequencies, it is necessary to replace the plates of the modulating circuits and their associated inductances with resonant cavities, which must, necessarily, be built to close tolerances. In the case of the quadrupolar pumping arrangement, the cavity generally has four inwardly extending pole members in order to concentrate the electric fields in the region of the beam. These poles must be accurately dimensioned and spaced in order to achieve the desired results, a requirement that is quite difficult to satisfy at the higher frequencies where the actual physical structures become quite small. In addition, for proper interaction, the pumping cavity must have the pump energy induced therein in proper phase and amplitude relationship among the various poles.

Such an arrangement as just described can readily be adapted to produce frequency multiplication. Instead of the beam being pumped by means of a quadrupolar cavity, the quadrupolar cavity has no signal applied to it whatsoever except the signal wave existing on the beam. When the beam passes through the cavity under these circumstances, it gives up energy to the cavity at twice the signal frequency, which energy can then be abstracted and utilized. Even greater frequency multiplication can be achieved by increasing the number of poles in the cavity, thus eight poles gives multiplication by a factor of four, sixteen poles by a factor of eight, and so on. Obviously, in view of the foregoing discussion, such increases in the number of poles serve to compound the difficulties of manufacture. In addition, utilization of such cavities for frequency multiplication prevents successful multiplication of other than integral multiples of the signal frequency, it being impossible to achieve a multiplication of, for example, two and one-half times the frequency.

It is an object of the present invention to produce amplification or frequency multiplication in a cyclotron wave device at microwave frequencies while eliminating the phasing problems inherent in a quadrupolar structure.

It is a further object of my invention to produce any desired degree of frequency multiplication whether the multiplication factor be an integral value of the signal frequency or not.

These and other objects of my invention are achieved in a first illustrative embodiment thereof which comprises an electron gun for forming and projecting an electron beam, means forming a longitudinal magnetic field for focusing the beam, and means for collecting the beam. The beam is projected through a first cavity resonator to which are applied signals to be amplified and which modulates the beam in fast cyclotron mode with the signals. This cavity, in addition, extracts noise on the beam in the fast cyclotron mode at the signal frequencies. After emerging from the first cavity the beam passes through a second cavity to which is applied pump energy and which acts upon the beam at the pump frequency, which is preferably, although not necessarily, twice the signal frequency. After emergence from the pump cavity the beam is projected through an output coupler cavity, which abstracts amplified signal waves from the beam.

In accordance with my invention, the pump cavity resonator, instead of having four poles, has only two diametrically opposed pole members. One of the pole members has its end adjacent the electron beam shaped to approximate a hyperbola, whereas the other pole member has its end adjacent the beam shaped as a 90 degree V symmetrical with the hyperbola shaped end of the other pole-piece, the beam being directed through the space between the two pole end faces.

In other illustrative embodiments of my invention comprising frequency multipliers, the cavity through which the beam is directed to produce a frequency multiplication has only two poles, the shape of the pole faces adjacent the beam being determined by the degree of frequency multiplication desired.

It is, therefore, a feature of my invention that the interaction circuit, regardless of the frequency at which it is to be utilized, has only two pole-pieces.

It is another feature of my invention that the shapes of the faces of the pole-pieces adjacent the beam are uniquely determined by the relationship of the frequency at which the circuit is designed to operate to the signal frequency.

These and other features of my invention will be more readily apparent from the following detailed description, taken in conjunction with the accompanying drawings, in which.

Figure 1A:
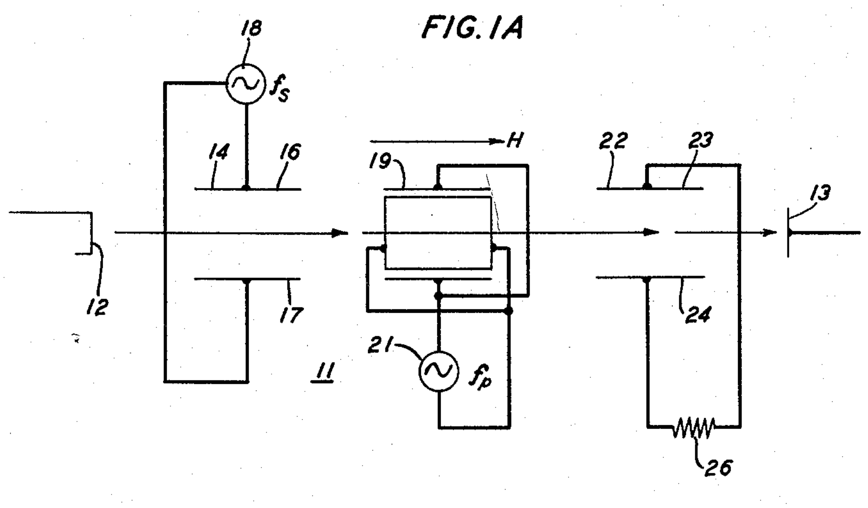
FIG. 1A is a schematic diagram of a quadrupole parametric amplifier.
Figure 1B:
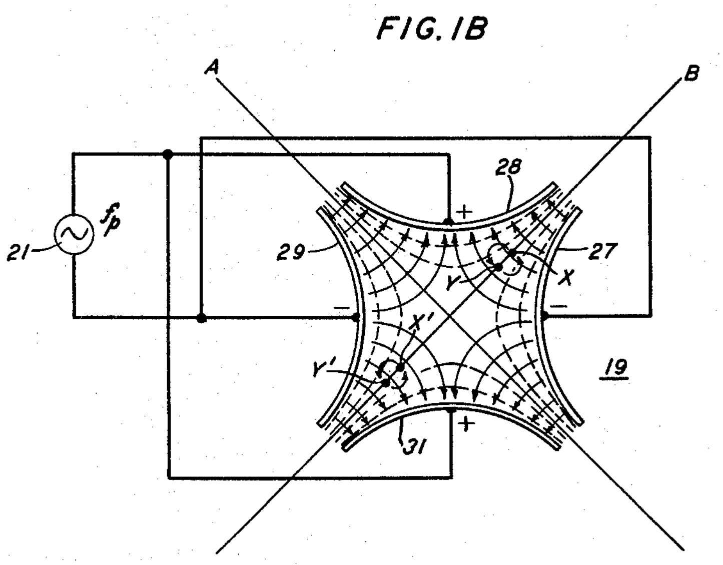
FIG. 1B is a diagram of the fields existing in a quadrupolar system.

Turning now to FIGS. 1A and 1B, there is shown schematically, for purposes of illustrating the quadrupolar pumping phenomenon, a parametric amplifier 11 of the type shown in the aforementioned Alder at el. article. For simplicity, only those portions of the device which are necessary for an understanding of the operation have been shown. The device 11 comprises an electron gun 12 for forming and projecting an electron beam to a collector 13. Means (not shown) are provided for establishing a longitudinal magnetic field H for focusing the electron beam. Adjacent the electron gun is provided an input coupler 14 which comprises plates 16 and 17. Coupler 14 is preferably of the type known as the Cuccia coupler, which interacts with the fast cyclotron mode of the electron beam. Coupler 14 is supplied with a signal at a frequency $f_s$ from a signal source 18. The Cuccia coupler, in addition to modulating the electron beam in the fast cyclotron mode at the signal frequency $f_s$, extracts from the beam the fast mode cyclotron noise waves existing thereon at the signal frequency $f_s$. The beam, upon leaving input coupler 14, passes through a quadrupolar pumping section 19 which is supplied with radio frequency pump energy at a frequency $f_p$ from a source 21. After passing through the quadrupolar pumping section, the beam passes through an output coupler 22 which comprises two plates, 23 and 24, and operates as a Cuccia coupler to extract amplified energy from the beam and apply it to a load 26.

For a better understanding of the pumping phenomenon and the amplification phenomenon reference should be had to FIG. 1B. FIG. 1B is a cross-section of the quadrupolar pumping section 19 of the device of FIG. 1A looking toward the collector 13. Pumping section 19 comprises four plates, 27, 28, 29 and 31, which are connected, as shown, to the source of pump energy 21. This particular connection arrangement is what is commonly referred to as the $\pi$ mode. Consider the potentials on the plates of the quadrupolar arrangement at a given instant of time during the oscillatory period of the pump 21, when plates 28 and 31 will have a positive potential value and plates 27 and 29 will have negative potentials. If the plates are given a hyperbolic shape, as shown, there will be established the electric fields depicted with the zero equipotential lines A and B intersecting in the center of the region bounded by the plates and being at right angles to each other. The electric lines of force extend from the negative plates to the positive plates and the equipotential lines, as shown by the dotted lines, form orthogonal squares therewith.

When the electron beam passes through the input coupler the electrons, which are traveling in the direction of the magnetic field H, are subjected to a transverse electric field. As a consequence, each of the electrons in the beam commences to spiral about an axis extending in the longitudinal direction and, inasmuch as the electrons are traveling in the longitudinal direction, each electron will describe a helical path. As the beam leaves the signal input coupler, therefore, each electron in the beam is orbiting about its own individual orbit axis. All of the electrons in the beam, however, are in phase, that is, they are at the same rotational position of their orbit. As the beam enters the pumping cavity, as depicted in FIG. 1B, the fields in the pumping cavity are, for example, as shown. Consider now an electron which enters the quadrupolar structure at the position X and which is rotating in the direction of the curved arrow, as shown. That electron is, as can be seen, in an accelerating field and it will, therefore, gain energy. As it continues on its orbit in the direction of the arrow to the point Y, which is approximately 180 degrees of its orbit removed from the point X, the field in the quadrupolar structure which, in this case, has a frequency twice the cyclotron frequency of the electron, has gone through one full cycle and, as can be seen, the electron at the point Y is in a decelerating field. Because of the hyperbolic configuration of the pole-pieces, the decelerating field at point Y, which is closer to the intersection of the zero equipotential lines A and B than the point X, is weaker than the accelerating field at point X, since the strength of the field varies with distance from the intersection of A and B, that is, the axis of the structure. As a consequence, although the electron at Y gives up energy to the decelerating field, it gives up less energy to the field than it gained from the accelerating field at point X. Consider now an electron which, at the instant of entrance into the quadrupolar structure, is in a decelerating field, such as at the point X'. Being in a decelerating field, the electron gives up energy to the field. However, when it has traveled 180 degrees of its orbit to the point Y' the quadrupolar field has gone through a full cycle and the electron is in an accelerating field. Since the point Y' is further removed from the intersection point of the zero equipotential lines than the point X', it is in a stronger field than the point X'. Therefore, the electron when at Y' acquires more energy from the field than it gave up to the field at X'. In like manner, it can be shown that regardless of the position of an individual electron in the beam, assuming that all of the electrons have substantially the same orbit diameter, the net gain in energy for each electron in going through one cycle of orbit is the same. This holds true so long as all of the electrons have the same diameter orbit and the plates have the proper shape. This net gain of energy of each of the electrons is subsequently given up in the output coupler to produce an amplified signal wave.

The foregoing discussion was based upon operation in the so-called denegerate mode, that is, where the pump frequency is twice the signal frequency. For the non-degenerate mode, that is, where the pump frequency is not exactly twice the cyclotron frequency, there will be a falling out of phase of the electrons in any given cross-section of the beam and a falling back into phase at some subsequent time. It can be shown, however, that the net result will be a gain in energy because the electrons will gain more energy while in phase than they will lose while out of phase.

Figure 2:
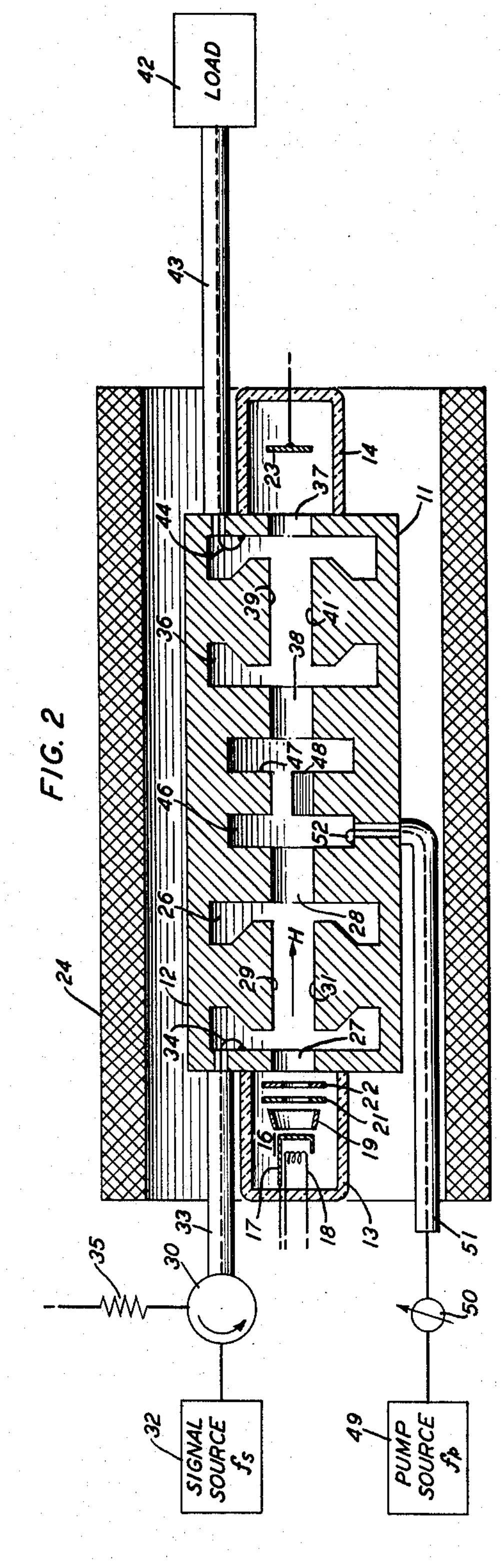
FIG. 2 is a sectional view of a first illustrative embodiment of the invention.

In FIG. 2 there is shown a fast cyclotron mode amplifier device embodying the principles of the present invention. The device 11 comprises an envelope consisting of a cylindrical metallic member 12, at one end of which is hermetically sealed a hollow member 13 of glass or other suitable material, and at the other end a hollow member 14 likewise of glass or other suitable material. Within glass member 13 is an electron gun 16, schematically shown, which comprises a cathode 17, a heater 18, beam forming electrode 19 and accelerating electrodes 21 and 22. Within member 14 is a collector 23, likewise schematically shown. The various electrical connections for the elements of the electron gun and for the collector have not been shown for purposes of simplicity, these connections being of conventional nature well known in the art.

In order that the electron beam may be focused there is provided a solenoid 24 for forming a magnetic field H which extends longitudinally along the beam path. While a solenoid has been shown as the means for forming the magnetic field, it is to be understood that any one of a number of well-known devices for forming such a field may be used in place of the solenoid 24.

Within the metallic member 12 is a first resonant cavity 26 having apertures 27 and 28, permitting passage of the electron beam through the cavity. Within resonant cavity 26 are a pair of pole members 29 and 31 which are the high frequency equivalent of the two plates of a Cuccia coupler. Cavity 26 is supplied with signal energy of a frequency $f_s$ from a signal source 32 through a circulator 30, schematically shown, a coaxial cable 33 and coupling loop 34. At the collector end of the member 12 is a second resonant cavity 36 which is substantially identical to the cavity 26, having apertures 37 and 38 to permit passage of the electron beam, and pole members 39 and 41 which, together with the cavity 36, function as a Cuccia coupler for abstracting energy from the electron beam. The energy thus abstracted is fed to a load 42 by means of a coaxial cable 43 and coupling loop 44. Within the member 12 and between cavities 26 and 36 is a third resonant cavity 46 which embodies the principles of the present invention. Within cavity 46 are a pair of pole members 47 and 48, which will be discussed more fully hereinafter in connection with FIG. 3. Cavity 46 is supplied with high frequency pumping power from a pumping source 49 through an adjustable phase shifter 50, a coaxial cable 51, and coupling loop 52. The frequency $f_p$ of the pump energy is approximately $2\omega_c$, where $\omega_c$ is the cyclotron frequency of the beam, which is approximately the frequency $f_s$ of the signal. Phase shifter 50 is necessary only in cases of purely degenerate operation, where $f_p$ equals $2f_s$.

In the embodiment depicted in FIG. 2, the apertures 27, 28, 37 and 38 are of sufficient diameter to pass the electron beam, but are of insufficient diameter to permit any degree of electromagnetic wave coupling between the three cavities 26, 36 and 46.

In operation, an electron beam is formed by gun 16 and directed through cavity 26 toward collector 23. Cavity 26, being supplied with signal energy from source 32, modulates the beam in the cyclotron mode in the manner discussed in connection with FIG. 1A and, at the same time, extracts noise energy from the beam.

The circulator 30 passes the signal energy from source 32 to cavity 26, but the noise energy extracted from the beam passes through line 33 to the circulator 30, which directs it into a dissipative element 35. While a circulator has been utilized in the device of FIG. 2, it is not necessary if the signal source 32 and the cavity 26 are properly matched.

After exiting from cavity 26 through aperture 28, the beam enters cavity 46, where it passes between the end faces of poles 47 and 48 and is modulated with pump energy, in a manner to be explained more fully hereinafter, to produce signal gain. After being modulated with pump energy, the beam passes through aperture 38 to cavity 36 where it gives up amplified signal energy to the cavity 36. The energy thus given up is extracted by means of coupling 44 and directed via transmission line 43 to a load 42. After exiting from cavity 36, the beam impinges on collector 23 which is maintained at a suitable potential for complete collection of the electrons.

Figure 3:
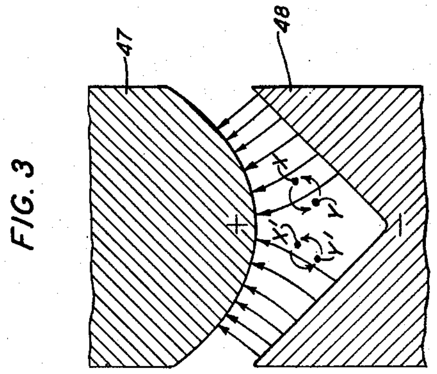
FIG. 3 is a diagram of the relationship of the electrons and the fields in a portion of the device of FIG. 2.

For an understanding of the manner in which the beam is modulated with pump energy in cavity 46 to produce gain, reference is made to FIG. 3. In FIG. 3 there are depicted the end faces of poles 47 and 48 between which the beam passes in traversing pump cavity 46. The end face of pole 48 has a V-shaped configuration, the apex of the V being a right angle, and the end face of pole 47 has a curved configuration in the shape of the arc of a circle. Ideally, the shape of the end face of pole 47 is hyperbolic, but it has been found that the arc of a circle is a sufficiently close approximation. Consider that at a given instant during a cycle of pump frequency the polarities of poles 47 and 48, and hence the field configuration are as depicted. An electron at point X, orbiting at the signal cyclotron frequency, at the instant of time depicted is accelerated by the field, thereby acquiring energy. One-half cycle of cyclotron frequency later the electron is at point Y, and the field is as depicted, there having been one full cycle of pump frequency. The electron is then in a decelerating field, but, as can be seen, this decelerating field at point Y is weaker than the accelerating field at point X, hence there is a net gain of energy by the electron. On the other hand, an electron in phase with the first electron and whose orbit passes through points X′ and Y′ is not, as can be seen, in a maximum acceleration field at point X′; however, it can be shown that through one full cycle of orbit, it experiences a net gain in energy equal to that of the electron orbiting through points X and Y. Inasmuch as all of the electrons in the beam have the same orbit diameter and in any given cross-section of the beam they are in phase with each other as they enter cavity 46, they will experience identical gains in energy, regardless of their position in the beam relative to poles 47 and 48. This stems from the fact that each orbiting electron passes through the same electric field gradient regardless of its position between poles 47 and 48. Inasmuch as cavity 46 acts upon all of the electrons in identical fashion, there are no spurious modulations introduced by cavity 46, hence the noise spectrum of the beam is preserved. Since this noise spectrum is devoid of signal frequency noise as a result of the action of cavity 26, the beam leaving cavity 46 remains noise free at the signal frequency.

In the discussion of FIG. 1B, it was pointed out that the $\pi$ mode of operation is desired. With the arrangement of FIG. 1B, this mode is easily realized. However, at microwave frequencies, the plates of FIG. 1B must be replaced by a resonant cavity having four symmetrically arranged poles. Such a structure, when supplied with energy by a single coupling loop, is susceptible to operation with the field of the $\pi$ mode distorted. It becomes necessary, therefore, to adapt extraordinary measures, such as multiple coupling loops and phase shifters, to insure achieving the desired $\pi$ mode. Cavity 46, on the other hand, resonates automatically in the desired mode without distortion of the field due to the coupling loop, thereby eliminating distortion problems. In addition, because there are only two poles, and the field shape is largely determined by the angle of the notch in the one pole, distortions due to mechanical misalignments are greatly reduced.

From the foregoing, it is readily apparent that the two-pole arrangement of the present invention accomplishes the same ends as the quadrupolar arrangements of the prior art, but possesses few, if any, of the enumerated disadvantages of the quadrupolar structure.

Figure 4:
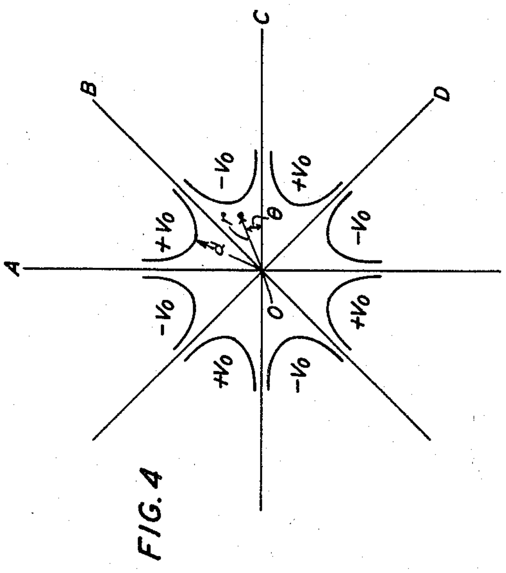
FIG. 4 is a diagram of a multipolar arrangement for purposes of explanation.

Thus far the discussion has dealt with pumping at a frequency that is approximately twice the signal frequency, necessitating either a quadrupolar arrangement or an arrangement as depicted in FIG. 3. In certain applications it is desirable to pump at other multiples of the signal frequency or, in the case of frequency multiplication, to multiply the signal frequency by some multiple other than two. In FIG. 4 there is depicted a diagram of an eight-pole arrangement which produces multiplication, for instance, by a factor of four. It can be seen that eight poles are necessary to produce the required field symmetry for operation in the $\pi$ mode. In general, the number of poles necessary is twice the multiplication factor. In the arrangement of FIG. 4, there are four zero equipotential lines, A, B, C and D, which intersect at the point O, any two adjacent lines forming an angle of 45 degrees. In any system, the angle $\alpha$ that is formed between any two adjacent zero equipotential lines is given by the expression $$\alpha=\frac{360^\circ}{2n} \qquad (1)$$

where $n$ is the multiplication factor. In any arrangement of more than four poles, the pole faces are no longer hyperbolic, but their configuration can be determined from the general equation for the field in the region defined by the poles, which equation is $$V=\frac{V_o}{d^n}r^n \sin n\theta \cos n\omega_c t \qquad (2)$$

where V is the voltage at any point in the region, $V_o$ is the voltage on the pole faces, $d$ is the distance from the point O to the center of a pole face, $r$ is the radius from the point O to the point in the system whose voltage is being determined, $\theta$ is the angle the radius forms with the X axis, $\omega_c$ is the cyclotron (signal) frequency, and $t$ is time. When the field configuration satisfies Equation 2 it can be shown that, as was the case with the arrangement of FIG. 1B, the action of the field on the electrons is the same for all of the electrons regardless of their position in the beam.

From the foregoing, it can be seen that only integral multiples of the signal frequency are possible if the necessary symmetry for gain is maintained. If, for example, the desired multiplication factor is three and one-half, seven poles are required, but it can be seen the requisite symmetry is destroyed and the $\pi$ mode cannot be achieved.

Figure 5:
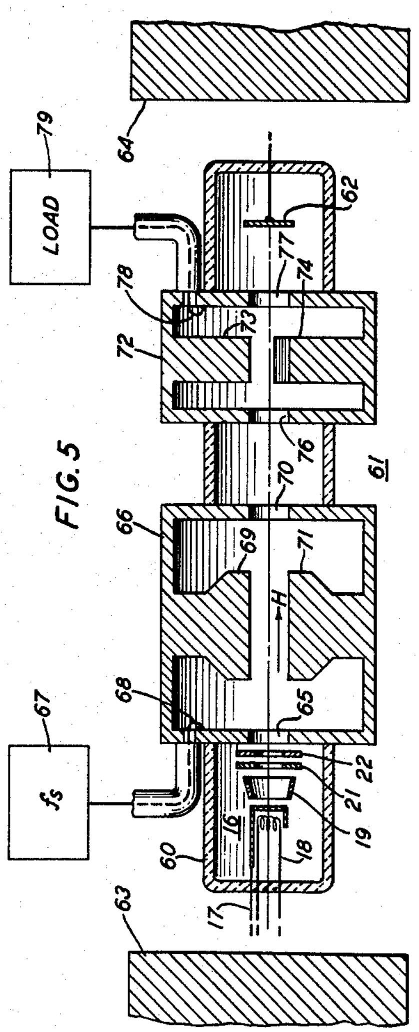
FIG. 5 is a sectional view of a second illustrative embodiment of the invention.

In FIG. 5 there is shown a frequency multiplier 61 embodying the principles of the present invention and designed to multiply the signal frequency by a factor of three and one-half. Device 61 comprises an envelope 60 of glass or other suitable material within which is mounted an electron gun 16 which is depicted schematically as being substantially identical to the electron gun 16 of FIG. 2. For simplicity, the elements of the gun 16 have been given the same reference numerals as the gun 16 of FIG. 2, and will not be further described. Gun 16 forms and projects an electron beam to a collector 62, shown schematically. An axial magnetic field H for focusing the beam is supplied by magnets 63 and 64, which may be the pole faces of a permanent magnet, or poles of an electromagnet. Adjacent gun 16 is an input cavity resonator 66 which is supplied with signal energy $f_s$ from a source 67 through coupling loop 68. The "signal" in this case does not have to be an intelligence bearing signal, but may be simply oscillations at the frequency $f_s$. Cavity 66 has a pair of poles 69 and 71 for modulating the beam in the fast cyclotron mode. Cavity 66 may be a Cuccia type coupler or it may take some other form, so long as modulation in the fast cyclotron mode is achieved. Apertures 65 and 70 are provided in resonator 66 to permit passage of the beam.

Spaced from resonator 66 is a second cavity resonator 72 embodying the principles of the present invention. Resonator 72 is designed to resonate at the desired frequency product, which, in the device of FIG. 5, is 3½ $f_s$. Within resonator 72 are a pair of pole members 73 and 74 which will be described more fully hereinafter. Apertures 76 and 77 permit passage of the electron beam. An output coupling loop 78 extracts energy from resonator 72, which energy is passed to a utilization device 79.

In operation, the electron gun 16 projects a beam through resonator 66 where it is modulated in the fast cyclotron mode at a frequency $f_s$. In passing through resonator 72, the beam gives up energy thereto at the frequency 3½ $f_s$, as will be explained more fully hereinafter, which energy is extracted by loop 78 and fed to utilization device 79.

Figure 6:
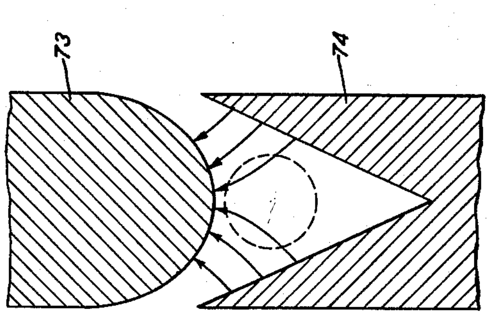
FIG. 6 is a view of a pole arrangement in accordance with the present invention.

In FIG. 6 there is depicted, greatly enlarged, a cross-section of a portion of cavity 72, showing the shapes of the faces of poles 73 and 74. As is known, when a modulated electron beam passes through a cavity, it will excite oscillations in the cavity at the resonant frequency. If the field thus excited in the cavity remains properly phased with the modulations on the beam, the oscillations in the cavity will build up to a usable strength. As has been pointed out in the foregoing, a multipolar cavity resonator is properly phased with the cyclotron wave on the beam when the $\pi$ mode can be sustained in the cavity and there is a proper even number of poles However, when the number of poles is odd, the resonator cannot resonate in the $\pi$ mode and the oscillations cannot be sustained. Inasmuch as the resonator 72 has only two poles, the two-pole equivalent of the $\pi$ mode automatically is set up. However, in order to produce the desired degree of multiplication, it is necessary to reproduce the field configuration given by equation (2). It has been found that if the face of pole 74 is V-shaped, with the angle of the V being determined by Equation 1, and the face of pole 73 being shaped to approximate the shape given in Equation 2, the field configuration of Equation 2 is achieved. Thus the V formed in the face of pole 74 forms an angle of approximately 51.4 degrees, and the face of pole 73 has the shape shown. The relative position of the electron beam is indicated by the dotted circle.

From the foregoing, it can be appreciated that virtually any degree of frequency multiplication can be achieved utilizing the present invention, whereas, heretofore, multiplication utilizing the cyclotron mode has been restricted to integral multiples of the base frequency.

Figure 7B:
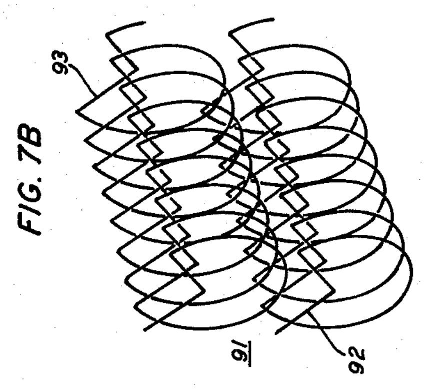
FIG. 7B is a perspective view of a fourth illustrative embodiment of the invention.
Figure 7A:
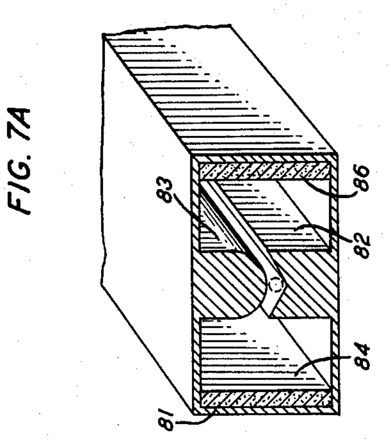
FIG. 7A is a perspective view of a third illustrative embodiment of the present invention.

Thus far the principles of the invention have been shown in embodiments utilizing lumped circuit elements, that is, cavity resonators. The present invention is readily applicable to distributed circuits as well. In FIG. 7A there is shown a ridged waveguide 81 in which the face of one ridge 82 is V-shaped and the face of the other ridge 83 is shaped in accordance with Equation 2. With such a circuit, an electron beam directed between the ridges can be pumped by a traveling pump wave. Dielectric loading 84, 86 is provided to slow the pump wave down sufficiently to achieve a phase relationship with the electron beam. This phase relationship is such that individual electrons in the beam see a constantly changing electric field and hence are pumped. In FIG. 7B, a coupled helix type of transmission line 91 is depicted. Line 91 comprises a first helix 92 wound so as to form a V as shown, and a second helix 93 wound so that the portion adjacent helix 92 approximates the configuration dictated by Equation 2. In actuality, to facilitate phasing, helices 92 and 93 are identical. In operation, the pump wave propagates on both helices, phased so as to give a transverse field, and the beam is directed between them, with a resulting pumping of the electron beam.

It is to be understood that the various embodiments described in the foregoing are intended as illustrative of the principles of the present invention. Various other arrangements can readily be devised in accordance with these principles by those skilled in the art without departing from the spirit and scope of the invention.

What is claimed is:

1. A microwave circuit for use in an electron beam device having an axial magnetic field, said circuit comprising means defining an interaction region along which the magnetic field extends and the electron beam passes, said last-mentioned means comprising solely a first member having a curved end face adjacent to the beam path and a second member opposite said first member on the other side of the beam path, said second member having a V-shaped end face opening toward said path, the curvature of said curved face being given approximately by $$V=\frac{V_o}{d^n}r^n \sin n\theta \cos n\omega_c t$$

where V is the voltage at a point in the interaction region, $V_o$ is the voltage on the end face of the member, $d$ is the distance from the apex of the V-shaped face to the center of the face of the opposite member, $r$ is the radius from the apex of the V-shaped face to a point on the face of the opposite member, $\theta$ is the angle the radius forms with an axis normal to the members, $\omega_c$ is the cyclotron frequency, $t$ is time, and $n$ is the multiplication factor between the frequency of waves on the circuit and waves on the beam, and the angle of the V of said V-shaped face is given approximately by $$\alpha=\frac{360°}{n}$$

2. A microwave circuit as claimed in claim 1, in which said interaction circuit comprises a waveguide having first and second ridges, said first ridge extending from one wall of said waveguide toward said electron beam and said second ridge extending from the opposite wall of said waveguide toward said electron beam.

3. A microwave circuit as claimed in claim 1, in which said interaction circuit comprises first and second wave propagating helices.

4. For use in an electron beam device for operation in the cyclotron wave mode, an interaction circuit comprising a hollow electromagnetic waveguide, a first ridge member extending from one wall of said guide toward the opposite wall and a second ridge member extending from said opposite wall toward said first member, the end of said second ridge member adjacent said first ridge member having a V-shaped configuration, and the end of said first ridge member adjacent said second ridge member having a curved configuration which is convex relative to said second ridge member.

5. For use in an electron beam device for operation in the cyclotron wave mode, an interaction circuit comprising a wave propagating circuit having first and second adjacent coextensive helices, said first helix having a V-shaped configuration over a portion of its cross-section normal to the direction of wave propagation and said second helix having a circular configuration over a portion of its cross-section normal to the direction of wave propagation, said circular portion being adjacent the V-shaped portion of said first helix, said circular portion being convex relative to said V-shaped portion.

6. For use in an electron beam type parametric amplifier having an axial magnetic field, a cavity resonator through which the electron beam passes and the magnetic field extends axially, said resonator having a resonant frequency higher than the frequency of the signals to be amplified, and means within said resonator defining an interaction region, said last-mentioned means comprising solely a first member having a curved end face adjacent to the electron beam path and a second member diametrically opposite said first member on the other side of said path from the first member, said second member having a V-shaped end face adjacent said path, the curvature of said curved end face being given approximately by $$V=\frac{V_o}{d^n}r^n \sin n\theta \cos n\omega_c t$$

where V is the voltage at any point in the interaction region, $V_o$ is the voltage on the end faces of the members, $d$ is the distance from the apex of the V-shaped face to the center of the face of the opposite member, $r$ is the radius from the apex of the V-shaped end face to a point on the face of the opposite member, $\theta$ is the angle the radius forms with an axis normal to the members, $\omega_c$ is the cyclotron frequency, $t$ is time, and $n$ is the multiplication factor between the signal frequency and the resonant frequency of the resonator, the angle of the V of said V-shaped end face being given by approximately $$\alpha=\frac{360°}{2n}$$

and means for applying pump energy to said resonator.

7. For use in an electron beam type parametric amplifier having an axial magnetic field, an interaction circuit along which the signal modulated electron beam passes and the magnetic field extends axially, said circuit comprising means defining an interaction region, said last-mentioned means comprising solely a first member having a curved end face adjacent to the electron beam path and extending in the direction thereof, and a second member opposite said first member on the other side of said beam path and extending in the direction thereof, said second member having a V-shaped end face opening toward said path, the curvature of said curved face being given approximately by $$V=\frac{V_o}{d^n}r^n \sin n\theta \cos n\omega_c t$$

where V is the voltage at any point in the interaction region, $V_o$ is the voltage on the end face of the member, $d$ is the distance from the apex of the V-shaped face to the center of the face of the opposite member, $r$ is the radius from the apex of the V-shaped face to a point on the face of the opposite member, $\theta$ is the angle the radius forms with an axis normal to the members, $\omega_c$ is the cyclotron frequency, $t$ is time, and $n$ is the multiplication factor between the signal frequency on the beam and the frequency of waves on said circuit, the angle of the V of said V-shaped face being given approximately by $$\alpha=\frac{360°}{n}$$

and means for applying pump energy to said resonator.

8. An interaction circuit as claimed in claim 7 wherein said circuit comprises a waveguide having first and second ridges, said first ridge extending from one wall of said waveguide toward the electron beam path and having a curved end face, and said second ridge extending from the opposite wall of said waveguide toward the beam path and having a V-shaped end face.

9. An interaction circuit as claimed in claim 7 wherein said circuit comprises first and second wave propagating helices, one of said helices having a curved cross section adjacent the beam path and the other of said helices having a V-shaped cross section adjacent said path.

References Cited by the Examiner

UNITED STATES PATENTS

| | | | |
|---|---|---|---|
| 2,542,797 | 2/51 | Cuccia | 315—5.28 XR |
| 2,835,844 | 5/58 | McBride | 315—5.52 |
| 2,912,613 | 11/59 | Donal et al. | 315—5.49 XR |
| 2,959,740 | 11/60 | Adler | 315—5 |
| 3,085,207 | 4/63 | Ashkin | 330—4.7 |
| 3,094,643 | 6/63 | Wade | 330—4.7 |

FOREIGN PATENTS

| | | |
|---|---|---|
| 729,930 | 5/55 | Great Britain. |

OTHER REFERENCES

"Parametric Amplification of the Fast Electron Wave," R. Adler, Proceedings of the IRE, June 1958, pages 1300–1301.

"A Low Noise Electron-Beam Parametric Amplifier," by R. Adler and G. Hrbek, Proceedings of the IRE, October 1958, pages 1756–1757.

ROY LAKE, *Primary Examiner.*

ARTHUR GAUSS, *Examiner.*